United States Patent [19]

Tsukagoshi

[11] 3,715,522

[45] Feb. 6, 1973

[54] MULTI-TRACK MAGNETIC HALL HEAD

[75] Inventor: Tsunehiro Tsukagoshi, Tokyo, Japan

[73] Assignee: Pioneer Electronic Corporation, Tokyo, Japan

[22] Filed: July 29, 1970

[21] Appl. No.: 59,219

[30] Foreign Application Priority Data

July 29, 1969 Japan ....................44/59478

[52] U.S. Cl. ..................179/100.2 CH, 340/174.1 F

[51] Int. Cl. .......................................G11b 5/38

[58] Field of Search.......179/100.2 CH; 340/174.1 F, 340/174 HA

[56] References Cited

UNITED STATES PATENTS 2,866,013 12/1958 Reis ..........................179/100.2 CH
3,114,009 12/1963 Camras et al. ..............179/100.2 CH

FOREIGN PATENTS OR APPLICATIONS 876,824 9/1961 Great Britain .............179/100.2 CH
893,449 4/1962 Great Britain .............179/100.2 CH

*Primary Examiner*—J. Russell Goudeau
*Attorney*—Sughrue, Rothwell, Mion, Zinn & Macpeak

[57] ABSTRACT

A multi-track magnetic head comprising a plurality of three-terminal T-type Hall elements each having one Hall potential terminal and two current terminals provided at both ends thereof, said Hall elements being arranged at positions aligned with a corresponding number of tracks provided on a magnetic tape to be reproduced, an electric power source supplying electric currents only to a selected number of Hall elements aligned with the tracks to be reproduced simultaneously, a common terminal provided on a balancing resistor connected across the power source, and a capacitor for adjusting the impedance of the power source so that the ratio between the impedance of each Hall element to the impedance of the power source is selected to be more than 100 in general cases and to be more than 10 when a stereophonic reproduction is undertaken.

7 Claims, 2 Drawing Figures

INVENTOR
TSUNEHIRO TSUKAGOSHI
BY
Sughrue, Rothwell, Mion, Zinn & Macpeak
ATTORNEYS

MULTI-TRACK MAGNETIC HALL HEAD

BACKGROUND OF THE INVENTION

This invention relates generally to magnetic heads to be employed for multi-track recording tape, and more particularly to a type thereof employing Hall type magnetic heads.

Hall type magnetic heads have been publicly known, and in these magnetic heads, it is difficult for the Hall potential terminals to be employed for picking up recorded signals provided on the surface of the Hall element slidingly contacting with the recorded tape. One reason for this is that the magnetic field caused by the magnetic tape is extremely weak and in order to pick up this weak field, the Hall element must be brought sufficiently close to the magnetic tape. This inevitably restricts the terminal width of the Hall potential terminal provided, if any, on the sliding surface of the Hall element. Another reason is that because there is substantially no available space found in the same plane of the Hall element, the lead wire from such a terminal, if it is provided, must be led from the Hall element with an insulating layer specifically provided for such a purpose, and this inevitably complicates the vapor deposition step of the Hall element production and also causes a deleterious effect on the magnetic field applied to the Hall element.

For eliminating the above described difficulty in the multi-track magnetic head, a three-terminal T-type Hall element has been recommended, for instance, in U. S. Pat. No. 3,114,009. However, as hereinafter described more in detail, such a type of multi-track magnetic head has been deferred by causing cross-talk between two adjacent channels or by necessitating readjustment of a variable resistor employed for providing a common terminal when a D. C. signal is reproduced.

SUMMARY OF THE INVENTION

Therefore, it is a primary object of this invention to provide an improved type of Hall element which can be employed with multi-track magnetic tape, wherein all of the above described drawbacks of the conventional element are substantially eliminated.

Another object of the present invention is to provide an improved type of a multi-channel magnetic head of a Hall element type, wherein the number of the terminals is kept to a minimum and yet the possibility of causing cross-talk is substantially eliminated.

Still another object of this invention is to provide an improved Hall type multi-channel magnetic head wherein the necessity of the above described readjustment of the variable resistor is completely eliminated.

These and other objects of the present invention can be achieved by the Hall type multi-channel magnetic head which comprises a plurality of three-terminal T-type Hall elements disposed at positions corresponding to the plurality of tracks provided on the magnetic tape, current terminals provided on both ends of these Hall elements, a Hall potential terminal provided at the approximate middle portion of the side of each Hall element opposite to the side slidingly contacting with the magnetic tape, an electric power source which can supply electric currents selectively to a required number of Hall elements out of said plurality of Hall elements, a balancing resistor connected across the power source terminals, a common terminal tapped off from a middle portion of the balancing resistor, and selecting portion for transferring the connections between the power source and the current terminals of the Hall elements, wherein when currents are supplied simultaneously from the power source to the required number of Hall elements, the connection is arranged in such a manner that the directions of the currents flowing through the adjacent Hall elements in the required number of the elements are disposed oppositely, and the ratio ($Zh/Zs$) of the impedance $Zh$ of each of the Hall elements and the impedance $Zs$ of the power source is selected to more than 100 or more than 10 when only stereophonic signals are reproduced.

The nature, principle, and utility of the present invention will be more clearly understood from the following detailed description when read in conjunction with the accompanying drawings.

DETAILED DESCRIPTION OF THE INVENTION

Figure 1:
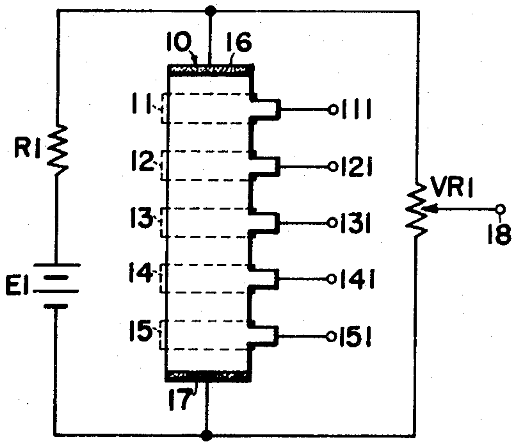
FIG. 1 is a circuit diagram showing an outline of a conventional magnetic head wherein a plurality of Hall regions are provided.

Before entering the explanation of the invention, a prior art conventional magnetic head employing a plurality of T-type Hall elements will be described briefly. Referring to FIG. 1 showing a circuit diagram for such a conventional magnetic head, it is clearly shown that the conventional magnetic head comprises a plurality of Hall regions 11, 12, 13, 14, and 15 formed on a substrate 10 consisting of, for instance a monocrystalline semiconductor substance, a DC power source E1 connected through a series resistor R1 across the current terminals 16 and 17 of the substrate 10, a plurality of Hall potential terminals 111, 121, 131, 141, and 151 provided on one side of these Hall regions 11 through 15 opposite to the side thereof in sliding contact with a magnetic recording tape (not shown), and a common terminal 18 provided on a variable resistor VR1 connected across the current terminals 16 and 17 of the substrate 10. As described in the previous part of this specification, the conventional multi-track magnetic head of the above-described construction has a drawback of cross-talk between the adjacent reproducing tracks of the signals. Namely, while an output Hall potential is picked up, for instance, between a Hall potential terminal 111 and the common terminal 18, other Hall potentials are also induced in all of the rest of the Hall regions 12 through 15 if a magnetic field is applied to each of the Hall regions, and a considerable amount of Hall potential particularly from the directly adjacent Hall region 12 is superposed on the output potential obtained across the terminal 111 and the common terminal 18, whereby the unwanted cross-talk is created in the output signal.

Furthermore, although a considerable number of terminals can be eliminated by the use of the T-type Hall elements and a common terminal, there is created another shortcoming particularly in the case where a DC. signal is to be reproduced, caused by the fact that the variable resistor VR1 must be readjusted for balancing the DC. output potential each time when the connections of the Hall regions are transferred.

For the above-described reasons, in ordinary cases, simultaneous reproduction of different kind of signals (not sterophonic reproduction) has been impossible.

This invention is directed to overcome these shortcomings of the conventional type magnetic head including Hall regions.

Figure 2:
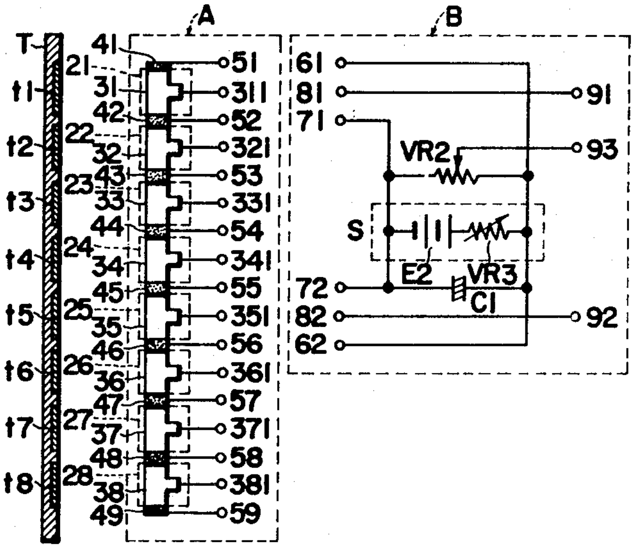
FIG. 2 is a similar diagram showing a multi-track magnetic head according to the present invention.

Referring to FIG. 2 showing a basic example of the multi-track magnetic head according to the present invention, there is indicated a magnetic tape T having eight recorded tracks *t*1 through *t*8 on a surface of the tape, a magnetic-electric conversion portion, generally denoted by A, including eight Hall elements 31, 32, . . . 38 of the T-type having individual magnetic substrates 21, 22, . . . 28 and arranged in positions confronting said eight tracks t1 through t8 on the magnetic tape T. Hall potential terminals 311 through 381 are provided at about middle portions of the side of the Hall elements opposite to the side thereof slidingly contacting with the magnetic tape. Current supplying terminals 51 through 59 are provided respectively on the conducting portions 41 through 49 provided at the ends of the respective Hall elements 31 through 38.

A selecting portion, generally designated by B, is also provided for selectively connecting a required number of Hall elements (in the case of drawing, two elements are employed) within said eight elements into reproducing state with respect to the tracks recorded on the magnetic tape.

The portion B includes a power source portion S comprising a DC. power source E2 for supplying a predetermined amount of current to each of the Hall elements and a variable resistor VR3 for adjusting the current value. As described above, the power source portion S selectively supplies the current thus adjusted to the current terminals of the required number of Hall elements to be simultaneously placed into operation through its own current terminals 61, 71 and 62, 72. Terminals 81, 82 are connected to the above-mentioned Hall potential terminals, and the thus picked-up Hall potentials are delivered from output terminals 91, 91. A common terminal 93 is connected to a sliding contact of a variable resistor VR2 which is connected across the DC. power source S for balancing the output potentials. Furthermore, a capacitor C1 is provided for lowering AC. impedance (Z*s*) of the power source portion S.

The operation of the above-described multi-track magnetic head of the Hall element type will now be described in detail. When the magnetic tape T beforehand recorded is moved in a direction perpendicular to the plane of the drawing, the recorded magnetic field on these tracks *t*1 through *t*8 pass through the magnetic substrates 21 through 28, so that the magnetic fields all perpendicular to the plane of the drawing are thereby created through the Hall elements 31 through 38. Thus, if a DC. current flows from the power source E2 through the variable resistor VR3, current terminal 61, current terminal 51, conduction portion of the substrate 41, Hall element 31, conducting portion 42, current terminal 52, current terminal 71, and back to the DC. power source E2, a Hall potential is created in the Hall element 31. Similarly, when the similar DC. current flows from the power source E2 through the variable resistor VR3, current terminal 62, current current terminal 56, conducting portion of the substrate 46, Hall element 35, conducting portion 45, current terminal 55, current terminal 72, and back to the DC. power source E2, another Hall potential is created in the Hall element 35. The Hall potential created in the Hall element 31 is thereafter conducted through the Hall potential terminal 311, terminal 81, to the output terminal 91, and the hall potential created in the Hall element 35 is conducted through the Hall potential terminal 351, terminal 82, to the output terminal 92, whereby the reproduced output voltages are obtained across the output terminals 91 and 92 and the common terminal 93.

In this case, it is assumed that AC impedances of these Hall elements 31 through 38 are all equal to Z*h*, and that AC impedance of the power source portion S is Z*s*. Then, when a Hall potential is created in, for instance, a Hall element 31, the voltage across the current terminals 51 and 52 is varied in accordance with the Hall potential. If the impedance Z*s* of the power source portion S is not adjusted to be far smaller than the impedance Z*h* of the Hall elements 31 through 38, the above described potential variation between the current terminals 51 and 52 is transferred to the circuit between the current terminals 55 and 56, whereby a potential variation proportional to the above mentioned potential variation across the current terminals 51 and 52 will be created at the Hall potential terminal 351 of the Hall element 35. That is, a cross-talk will be created in these two Hall potential terminals.

According to the present invention, the DC. voltage of the power source portion S is adjusted to a suitable value by means of the variable resistor VR3, and the AC impedance Z*s* of the power source portion S is reduced to a smaller value by means of the capacitor C1. As a result, the potential variation between for instance, the terminals 51 and 52 is decreased, and the influence caused on the potential across the terminals 55 and 56 is minimized.

In ordinary cases, a leakage of a signal or the crosstalk between different signal channels of about 40 dB or more, and a separation between the right and the left channels in the stereophonic signals of about 20 dB or more are considered to be sufficient for rendering a good listening. For this reason, the impedance ratio of Z*h*/Z*s* (wherein Z*h* is an AC impedance of the Hall elements and Z*s* is the impedance of the power source portion S) is selected to approximately more than 100, and in the case where only channel separation in the stereophonic representation is desired, the impedance ratio is selected to approximately more than 10.

When a DC. signal is to be reproduced, a similar concept may apply, and the DC impedance of the power source portion S is set at a sufficiently smaller value than the DC. impedance of the Hall elements.

With the above described construction and the characteristics of the selecting portion B, the Hall element pairs such as 31 and 35, 32 and 36, 33 and 37, and 34 and 38 are sequentially placed in operable condition, whereby the tracks on the magnetic tape T are reproduced stereophonically.

As is made apparent hereinabove, with the multi-track magnetic head according to the present invention, a number of tracks out of the total number of tracks recorded on the magnetic tape T can be simultaneously reproduced while the cross-talk between different signals thus reproduced can be minimized and the channel separation between the stereophonic signals belonging to a same program-source can be maintained at a superior condition.

Furthermore, the transfer operation of the selecting portion B can be easily carried out through the employment of well known contactless switching devices such as electronic switches, and also with the employment of vapor deposition techniques the plurality of Hall elements can easily be manufactured at positions opposed respectively to the tracks on the magnetic tape. From these facts, it is apparent that an improved and versatile multi-track magnetic head which does not require up-and-down movement mechanically has been obtained according to the present invention.

What is claimed is:

1. A multi-track magnetic head comprising a plurality of three terminal Hall elements, each Hall element having two current terminals, one at each end thereof, and one Hall potential terminal positioned on the side of the element opposite to the side which contacts a magnetic tape to be reproduced, said plurality of Hall elements being arranged side by side in positions adapted to be aligned with a plurality of tracks on the magnetic tape; electric power source means for supplying current only to selected ones of said plurality of Hall elements which are aligned with the tracks to be simultaneously reproduced, wherein said selected ones are less than all of said plurality; a balancing resistor connected across said power source, said resistor having a terminal common to said selected ones of said Hall elements; and means for reducing the cross-talk between the selected ones of said Hall elements, said means including means for adjusting the impedance of said power source so that the ratio of the impedance of each of the selected ones of said Hall elements to the impedance of the power source is selected to be larger than approximately 100 for nonstereophonic recorded signals and/or 10 for stereophonic recorded signals.

2. A multi-track magnetic head as defined in claim 1 wherein said means for adjusting impedance of the power source is a capacitor connected across said power source.

3. A multi-track magnetic head as defined in claim 1 wherein said power source comprises a D.C. power source and a current adjusting variable resistor connected in series.

4. A multi-track magnetic head as defined in claim 1 wherein said selected number of Hall elements aligned with the tracks to be reproduced simultaneously is selected to be two.

5. A multi-track magnetic head as defined in claim 4 wherein the currents supplied only to said two Hall elements aligned with the tracks to be reproduced simultaneously flow through said two Hall elements in opposite directions so that the output Hall potentials from said two Hall elements are of opposite polarity.

6. A multi-track magnetic head as defined in claim 1, further comprising switching means whereby said electric power source means supplies current only to said selected ones of Hall elements, through said switching means.

7. A multi-track magnetic head as defined in claim 6 wherein said switching means are of the electronic type which can transfer all of said terminals simultaneously.

* * * * *